Figure 1:
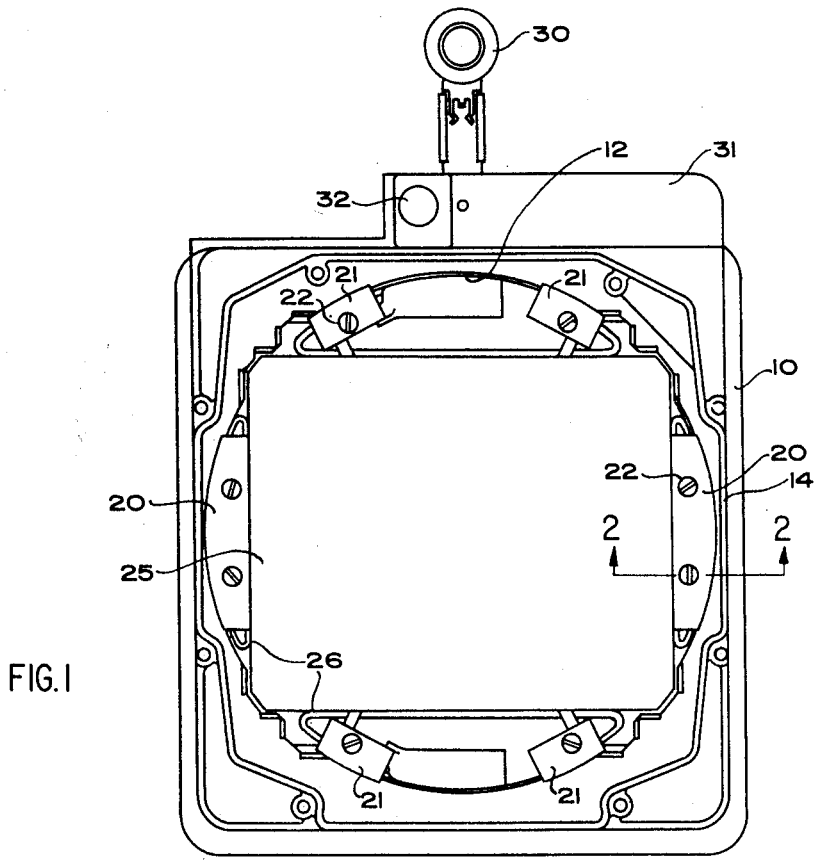

Nov. 8, 1960 R. L. DALTON 2,959,112
BACK ASSEMBLY FOR PHOTOGRAPHIC CAMERAS
Filed Dec. 22, 1958

INVENTOR.
ROBERT L. DALTON
BY
Attorney

United States Patent Office 2,959,112
Patented Nov. 8, 1960

2,959,112

BACK ASSEMBLY FOR PHOTOGRAPHIC CAMERAS

Robert L. Dalton, Pittsford, N.Y., assignor to Graflex, Inc., Rochester, N.Y., a corporation of Delaware Filed Dec. 22, 1958, Ser. No. 782,231

8 Claims. (Cl. 95—48)

The present invention relates to photographic cameras, and more particularly to a photographic camera having a back which is rotatable to position the exposure aperture, and the film behind it, for either a horizontal or a vertical picture.

One difficulty where the back is rotatable on the camera casing is of insuring a proper light seal between the rotary back and the casing to prevent light leaking through between the back and the casing and striking the film.

Many cameras today are made from magnesium castings. Where the camera casing is a magnesium casting, and the back is also a magnesium casting, there has heretofore been another difficulty when a rotary back is used; the confronting surfaces of the casing and the back rubbing against one another when the back is rotated in the casing, will cause galling and ultimate corrosion.

One object of the present invention is to provide a camera of the type having a rotary back, which has an improved light seal between the back and the camera casing.

Another object of the invention is to provide a camera which has a rotary back, yet in which the camera casing and also the back can be made from magnesium castings, but in which the two castings are prevented from rubbing against one another, thereby obviating galling.

Other objects of the invention will be apparent hereinafter from the specification and from the recital of the appended claims.

Figure 2:
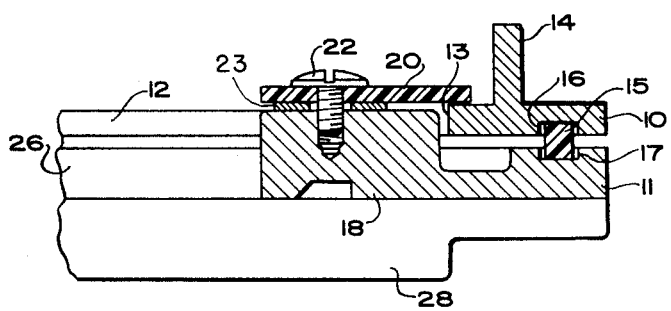

In the drawing:

Fig. 1 is a front view of the back of a camera made according to one embodiment of this invention; and Fig. 2 is a section taken on line 2—2 of Fig. 1 on an enlarged scale and looking in the direction of the arrows.

Referring now to the drawing by numerals of reference, 10 denotes a fixed plate at the rear of the camera casing; and 11 designates a rotary back secured thereto. The plate 10 has an opening 12 therethrough which is bounded by a wall 13. It is formed with forwardly projecting strengthening ribs 14.

The back 11 rotates on a nylon or similar plastic ring 15 which is mounted in a circular groove 16 in the plate 10 and in a confronting groove 17 in the back. The back is formed with protrusions 18 which extend into the opening 12 of the plate 10, and which are adapted to be secured to the plate 10 by nylon retainers 20 and 21. There are two of the retainers 20 mounted in diametrically opposed relation to one another on the back; and there are four retainers 21. The four retainers 21 are grouped in two pairs, the two retainers 21 of one pair being disposed, respectively, diametrically opposite the two retainers 21 of the other pair. One pair of retainers 21 is positioned between the two retainers 20 at one side of the opening 12, and the other pair of retainers 21 is mounted between the two retainers 20 at the opposite side of opening 12. The retainers are secured to the back by screws 22, which pass through the retainers and thread into the back. Washers 23 may be interposed between the retainers and the back, to properly space the retainers from the back so that they extend over the adjacent edge of the plate 10.

The back is formed with a rectangular frame opening 25, which is bounded by the walls 26 and which constitutes the framing aperture for the camera. The back is also formed at its rear with parallel longitudinally disposed walls 28 that bound a recess or well adapted to receive the film pack adapter, a cut film magazine, or other sensitized film holder.

30 designates the rear sight of the camera. 31 is the range finder casing and 32 is the sighting aperture for the range finder.

The nylon ring 15 serves to hold the back in spaced relation from the plate 10 so that the confronting surfaces of the front and back do not rub on one another. This nylon ring also serves as a light seal between the back and plate, preventing any leakage of light between them. The nylon clamp fingers 20 and 21 have some resiliency, and hold the back resiliently on the camera casing so that it can be rotated on the plate 10 without undue exertion. These clamping fingers or plates also obviate scratching as the back is rotated on the plate.

While the invention has been described in connection with a particular embodiment thereof it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A photographic camera having a casing and a part rotatably mounted thereon, said part having an image-framing opening therein, a resilient plastic ring surrounding said opening and interposed between said part and casing to seal around said opening against light leakage and to act as a bearing rotatably supporting said part on said casing.

2. A photographic camera as claimed in claim 1 in which means are provided for resiliently clamping said part to said casing, said means preventing separation of the part from the casing when the part is rotated on the casing and resiliently holding said part on said ring.

3. A photographic camera as claimed in claim 1 in which said casing and said part have confronting annular recesses surrounding said opening, and said ring is positioned in said recesses and in which means are provided for resiliently clamping said part against said ring to resiliently hold said part against said ring, said means preventing separation of said part from said casing when said part is rotated on said casing.

4. A photographic camera as claimed in claim 3 in which both said part and said casing are magnesium castings, and said ring spaces said part from said casing to prevent rubbing of said part on said casing as said part is rotated, and said ring is made of a plastic which will not gall magnesium.

5. A photographic camera having a plate, and a back rotatably mounted thereon, said plate having an opening into which said back projects, a resilient, plastic ring surrounding said opening and interposed between one side of said plate and said back to seal against light leakage and to rotatably support said back on said plate, and means disposed at the opposite side of said plate for resiliently holding said back on said plate and in said opening and against said ring, said ring constituting the sole means by which said back is rotatably supported on said plate, and said back having an image-framing aperture therein.

6. A photographic camera as claimed in claim 5 in which said ring is mounted in confronting annular recesses in said back and plate.

7. A photographic camera as claimed in claim 5 in which said plate and back are magnesium castings, and said ring and holding means are made of a plastic which will not gall magnesium when moved thereover, and said ring acts to space the castings from one another to prevent one casting from contacting and rubbing on the other as said back is rotated.

8. A photographic camera as claimed in claim 7 in which said ring and holding means are made of nylon.

References Cited in the file of this patent
UNITED STATES PATENTS 1,788,645     Velten _____ Jan. 13, 1931

FOREIGN PATENTS 175,806     Great Britain _____ Mar. 2, 1922